United States Patent [19]

Supcoe et al.

[11] Patent Number: 4,631,302

[45] Date of Patent: Dec. 23, 1986

[54] UNDERWATER BIOCIDAL WAX COMPOSITION AND PREPARATION THEREOF

[75] Inventors: Robert F. Supcoe, Annapolis, Md.; Thomas Radakovich, Falls Church, Va.

[73] Assignee: The United States of America as represented by the Secretary of the Army, Washington, D.C.

[21] Appl. No.: 749,975

[22] Filed: Jul. 1, 1985

[51] Int. Cl.$^4$ ........................................... A61K 31/745
[52] U.S. Cl. ..................................... 523/122; 424/83; 524/341; 524/473; 524/92; 524/100; 524/209; 524/398; 524/413; 427/416
[58] Field of Search .......................... 424/83; 523/122; 524/341, 473, 92, 100, 209, 398, 413; 427/416

[56] References Cited

U.S. PATENT DOCUMENTS

| | | | |
|---|---|---|---|
| 2,966,440 | 12/1960 | Gerolt | 424/83 |
| 2,970,081 | 1/1961 | McCall et al. | 424/83 |
| 3,029,188 | 4/1962 | Cyr et al. | 424/83 |
| 3,033,809 | 5/1962 | Saroyan et al. | 424/83 |
| 3,215,599 | 11/1965 | Thau et al. | 424/83 |
| 3,274,137 | 9/1966 | Saroyan et al. | 424/83 |
| 3,551,192 | 12/1970 | Reinert | 424/83 |
| 3,642,635 | 2/1972 | Macleod | 424/83 |
| 4,020,200 | 2/1977 | Groszek et al. | 427/106 |
| 4,085,251 | 4/1978 | Rak | 424/83 |
| 4,115,130 | 9/1978 | Crump et al. | 106/15 |
| 4,143,010 | 3/1979 | Rak | 424/83 |
| 4,166,111 | 8/1979 | Cardarelli | 424/83 |
| 4,183,757 | 1/1980 | Groszek et al. | 427/416 |
| 4,228,614 | 10/1980 | Cardarelli | 424/83 |
| 4,237,113 | 12/1980 | Cardarelli | 424/83 |
| 4,293,339 | 10/1981 | Supcoe et al. | 106/18.29 |
| 4,410,363 | 10/1983 | Supcoe et al. | 106/18.29 |

*Primary Examiner*—Joseph L. Schofer
*Assistant Examiner*—N. Sarofim
*Attorney, Agent, or Firm*—L. A. Marsh

[57] ABSTRACT

A biocidal wax composition for preventing corrosion and biological fouling and surface degradation of submerged structures comprises from about 10 to about 40 percent of total biocidal wax composition of a biocidal polymeric gel consisting of a polymer from the group consisting of a polyethylene, polypropylene, a copolymer of polyethylene and vinyl acetate, and mixtures thereof and a solvent selected from the group consisting of mineral oil, a paraffin wax and mixtures thereof, and a biocide; and from about 60 to about 90 percent of total biocidal wax composition of a wax matrix composition consisting of petrolatum, at least two chlorinated waxes, and a microcrystalline wax. The biocidal wax is prepared by shock-cooling a hot solution of a polymer through its cloud point, admixing a biocide with the gel, and admixing the above wax matrix composition with the gel.

7 Claims, No Drawings

UNDERWATER BIOCIDAL WAX COMPOSITION AND PREPARATION THEREOF

BACKGROUND OF THE INVENTION

This invention pertains generally to coatings and particularly to bioactive wax coatings.

The drag of a ship's hull increases significantly from micro to macro hard fouling which results from the attachment of marine organisms, such as bacteria, algae and barnacles, on the hull surface. Even after these organisms are removed, the smoothness of the hull is seriously reduced by the pitting caused by these organisms.

Other submerged structures experience deterioration caused by marine growth or corrosion. Wooden blocks and piers can be destroyed in a few years if left untreated. Many of the traditional treatments, e.g., creosote, create serious environmental problems. Metal structures, e.g., propellers and anchor chains, lose appreciable performance capability or strength through corrosion and marine growth on their surfaces.

One approach to reducing marine growth is coating the surface with a coating toxic to marine organisms. The coating usually comprises a matrix with one or more toxic materials in the matrix.

A frequently used type of matrix is resinous and forms a paint. The disadvantages of paints are their expense, the diminution of their effectiveness in time, the difficulty of mechanically renewing the smoothness of the paint surface, and the frequent corrosive effect of the toxic substances on the metallic hull.

Instead of coating a hull with toxic paint, the hull can be coated with non-toxic paint that is coated with a biocidecontaining wax. Toxic waxes are also used to renew toxic paint surfaces after the paint has lost its toxicity. The wax coating disclosed in U.S. Pat. No. 4,020,200 by Groszek et al. is typical, i.e., a wax with a stable biocide that is insoluble in seawater but soluble in the wax. Another example is the wax composition in U.S. Pat. No. 4,115,130 by Crump et al. which also includes porous minerals to slow the release of the biocide.

The rate of release is important to biocidal coatings because if the biocide is released too quickly an environmental problem is created and the coating becomes ineffective too quickly. On the other hand, the rate of release must be sufficient to maintain the required biocide concentration at the surface of the submerged structure.

The wax compositions in U.S. Pat. Nos. 4,410,363 and 4,293,339 by R. F. Supcoe and T. Radakovich utilize certain halogenated waxes and wax combinations to provide superior adhesion to a submerged surface and retention of the biocide to provide a very durable and effective coating for retarding marine growth on the submerged surface. The wax composition in U.S. Pat. No. 4,293,339 has the additional important advantage of being capable of underwater application. The other wax compositions require the removal of the surface from the water or the water from the surface before an effective coating on the surface is possible, i.e., a coating that is smooth, continuous, uniform and strongly adhering. The disadvantage of the above wax composition is the use of one or more fluoropolymers which greatly increases the cost of the wax coating.

A biocidal wax coating that can adhere strongly to a surface to form a smooth durable coating over a wide range of temperatures, even if the wax is applied under water or on a wet surface, is an important improvement in the technology. If such a wax can be compounded without fluoropolymers, the versatility and cost of this wax would permit a wide variety of uses.

SUMMARY OF THE INVENTION

It is, therefore, an object of this invention to reduce the maintenance costs for sea-going ships.

Another object is to improve the performance of ships by reducing drag from a coarse and rough hull surface.

A further object of this invention is to apply a smooth coating of a wax that contains a large amount of a slow-releasing biocide to the surface of a submerged structure.

A still further object of this invention is to produce strong adhesion by a bio-effective wax to a submerged structure.

These and other objects are achieved by a biocidal wax comprising a biocide-containing polymeric gel that is dispersed in a microcrystalline-chlorinated paraffin wax matrix. The polymeric gel permits a high biocide loading of the wax and produces an effective release rate. The wax matrix is able to displace water molecules on a wet surface, spread easily, and form a uniform and durable coating.

DETAILED DESCRIPTION OF THE INVENTION

The wax compositions of this invention comprise several types of waxes: paraffin waxes, microcrystalline, and chlorinated waxes. Each type contributes a needed property to the final wax coating or its application. Unlike the wax composition of U.S. Pat. No. 4,293,339, which has extremely hydrophobic fluorinated compounds, these waxes also must be optimized for underwater application and compatibility to prevent separation over the operational temperature range.

A paraffin wax refers to the waxes derived from the wax-distillate fraction of crude petroleum and has a molecular weight from about 260 to about 460 and a melting point from about 49° C. to about 60° C. Paraffin waxes improve spreadability, but are not durable. The principle purpose of a paraffin wax in the subject wax compositions is to be a solvent for the polymer in the biocidal gel. The preferred paraffin waxes have a melting point from 55° C. to 60° C. and a molecular weight from 260 to 350.

Microcrystalline waxes are derived from the heavy lubricating-oil fractions of the petroleum distillate. A microcrystalline wax has an average molecular weight from about 400 to about 700, has from about 40 to about 50 carbon atoms, and a melting point above about 65° C. A microcrystalline wax is generally tough but difficult to spread. The presence of a paraffin wax, for example, would compensate for the low plasticity of a microcrystalline wax. Petrolatum is a two-phase colloidal system or gel consisting of high molecular weight hydrocarbon oils dispersed in microcrystalline waxes. Composition and physical properties vary considerably and so petrolatum is described by its physical properties.

Chlorinated waxes (chlorowaxes) are short-chain chlorinated aliphatic saturated hydrocarbons. The properties of a particular commercial chlorinated wax depend on the nature of the starting paraffin, the chlorine content and the manufacturing process. The chlorinated waxes of this invention have, on an average, from about 10 to about 30 carbon atoms and a chlorine content from about 40 to about 70 percent. It has been determined that a mixture of chlorowaxes produce significantly better results than a single chlorowax. Exemplary of commercially marked chlorinated waxes are Chlorowax (Diamond Shamrock) and Cereclor (Imperial Chemical Industries, Ltd.).

For an effective application of a biocide-containing wax with a high biocide concentration underwater or on a wet surface, it is necessary to combine the biocide with a polymeric, i.e., nonwax, gel. The polymeric gels found to hold a high concentration of the biocides of this invention and be compatible with the wax matrix of the subject compositions are gels of polyethylene, polypropylene, a copolymer of polyethylene-vinyl acetates and mixtures thereof.

The polyethylene and polypropylene polymers are non-polar, branched but crystalline thermoplastics and are referred to as low density. The polyethylene is typically prepared by free-radical bulk polymerization of the monomers under high pressure. The chain can contain many long or short branches and their number affects the polymer density. For compositions of this invention, the molecular weight is from 12,000 to 25,000 and a density from 0.90 to 0.93 g/cc. The copolymers have a vinyl acetate content from 15 to 30 percent with 19 to 28 percent preferred. The preferred solvents are mineral oil and shortchain or paraffin waxes with a melting point below about 25° C.

The gels are prepared by shock-cooling a hot polymer solution through the cloud point which is the temperature at which a hot relatively clear solution of a polymer becomes cloudy or fairly opaque upon cooling. The hot polymer solution is preferably prepared by admixing a polymer with a solvent at a temperature at least 5° C. above the cloud point and preferably from about 5° to 15° C. above the cloud point. The solution is from about 85 to 100 percent concentrated and preferably from 95 to 100 percent concentrated. Subsequent cooling to room temperature causes the complete precipitation of the polymer in the form of a fine-particle gel. The cooling through the cloud point should be extremely rapid.

The change from solution to the colloidal state occurs between about 5° and 10° C. below the cloud point. It is in the range from the cloud point to the change of state that the cooling rate has an effect on the quality of the gel. Shock cooling can be achieved in several ways, e.g., by cooling the solution quickly in thin layers as on a three-roll mill, by the addition of a cold solvent to the hot solution, or by addition of the hot solution to a cold solvent. The use of the cold solvent of the solution to shock cool the solution is preferred in order to prevent contamination problems. The biocides that are suitable for the biocidal gels and wax compositions of this invention are organotin polymers or polysiloxanes, toxic copper compounds such as copper oxide and copper-2-ethyl hexoate, and chlorinated compounds. Since a major constituent of the wax matrix is one or more chlorinated waxes, the preferred biocides are chlorinated compounds, such as 4-chloro-m-cresol, p-dichlorobenzene, 2,3,4,6-tetra-chloro-4-(methyl-sulphonyl) pyridine, tetrachloroglycoluril, dichlorophen, and 2,4,5,6 tetrachloroisophthalonitrile. The most preferred biocide is the above tetrachlorophthalonitrile.

The amount of biocide to be added to the gel is from about 15 to 50 weight percent of the total weight of the resulting biocidal gel. Since one of the purposes of the gel is to maximize the loading of the biocide in the wax composition, the preferred amount of biocide is from 40 to 50 weight percent of the biocidal gel and, of course, the most preferred would be 50 percent of the gel weight. A 50 weight percent concentration is equal to the inclusion of a biocide equal in weight to the gel, i.e., a 100% loading of the gel.

The wax matrix composition comprises petrolatum in an amount from about 20 to about 37 weight percent and preferably from 25 to 33 weight percent; one or more chlorinated waxes in an amount from about 40 to 60 weight percent and preferably from 45 to 55 weight percent; and a second microcrystalline wax in an amount from about 10 to about 25 weight percent and preferably from 12 to 18 weight percent.

Petrolatum has a melting point from about 48° C. to about 57° C. (ASTM D 127), a viscosity at 99.5° C. from about 60° to about 75 SUS, and a consistency at 25° C. (ASTM D 937) from about 140 to about 240. This petrolatum is classified as a white petrolatum.

The best and most consistent results for underwater applications have been obtained with a particular blend of chlorinated waxes. It is theorized that this particular blend is so effective because each wax compensates the others in terms of either the ability to displace water molecules at the submerged or wet surface or toughness of coating. The chlorinated wax composition comprises from about 16 to 26 weight percent of a chlorinated wax having an average number of carbon atoms from about 11 to about 13 and a chlorine content from about 65 to 70 percent, from abut 8.5 about 11.5 weight of chlorinated wax having an average number of carbon atoms from about 22 to about 26 and a chlorine content from about 39 to 45 percent, from about 8 to 12 weight percent of a chlorinated wax having an average number of carbon atoms from about 11 to 13 and a chlorine content from about 55 to about 65 percent, and from about 9 to 13 weight percent of a chlorinated wax having an average number of carbon atoms from about 18 to about 22 and a chlorine content from about 36 to about 44 percent. The preferred composition for the chlorinated wax blend comprises from 21 to 23 weight percent of a chlorinated wax having an average number of carbon atoms of 11.5 and 12.5 and a chlorine content from 68 to 70 percent, from 9 to 11 weight percent of a chlorinated wax having an average number of carbon atoms from 23 to 25 and chlorine content from 41 to 44 percent, from about 9 to 11 weight percent of a chlorinated wax having an average number of carbon atoms from 11.5 to 12.5 and a chlorine content from 58 to 62 percent, and from 10 to 12 weight percent of a chlorinated wax having an average number of carbon atoms from 19 to 21 and a chlorine content from 38 to 42 percent. The above weight percentages are percentages of the wax composition weight.

Other chlorinated wax combinations or a single chlorinated wax proxuce a coating that is not as uniform and strong or has a more limited operating range as a coating produced by this particular wax combination if the coating is applied underwater. If the surface is not underwater or very wet, these other wax formulations would be extremely effective because of the high biocide content and favorable biocide release rate of the polymeric gel.

A second microcrystalline wax is included in the overall wax formulation. This wax is a typical microcrystalline wax which accordingly increases the hardness and durability of the wax coating. The preferred wax has a melting point from about 65° C. to 72° C. (ASTM D-127-30), a specific gravity at 15.5° C. is from 0.91 to 0.92, a Saybolt viscosity at 99° C. from 65 to 85, and a penetration from 25 to 35 as determined by ASTM D-5-25. The amount of this microcrystalline wax is from about 10 to about 18 weight percent and preferably from 13 to 16 weight percent of the total biocidal-wax-composition weight.

The amount of the wax matrix composition is from about 60 to about 90 percent of the total biocidal wax composition weight and preferably from 65 to 75 weight percent. Accordingly, the amount of the biocidal gel is from about 10 to 40 percent of the total biocidal wax composition and preferably from 25 to 35 weight percent.

An anionic surfactant can be added to enhance the wetting ability, i.e., the ability to displace water molecules on the surface to be treated. The amount of surfactant can be as high as about three percent of the total biocidal-wax-composition weight; however, the usual amount is from 0.5 to 2 weight percent of the total wax composition. Examples of anionic surfactants are amine salts of carboxylic acids.

The biocidal wax composition is prepared by preparing a polymeric gel in the manner previously described; mixing in a biocide to form a biocidal gel; preparing a wax mixture of petrolatum, chlorinated waxes, a second microcrystalline wax, and any surfactant; heating the wax mixture to a temperature from about 50° to about 60° C. and preferably from 52° to 56° C.; admixing the wax mixture and the biocidal gel to form the biocidal wax, and mixing the biocidal wax while the wax cools to room temperature, (about 20° C.)

For large surfaces, such as a large hull, the biocidal wax composition is preferably applied underwater by spraying. Preferably, the wax is applied at a temperature from about 40° C. to 70° C., and most preferably from 50° C. to 60° C. A spraying pressure from about 60 psi to about 150 psi is preferably used in order to ensure that the wax fills most small cracks, nicks and other minor imperfections in the surface rather than coat over the imperfections. Special spraying equipment must be used in order to minimize waste and pollution.

It is preferred for intermediate surfaces to apply the wax underwater with a brush or wide flat applicator, such as a hard foam material. For a small application, e.g., a propeller on a small ship, a simple cloth can be used. It has been determined that an anchor chain can be easily coated by brush, as the anchor is raised and the chain, in turn, coats the metal sprocket, drum and other metal parts of the anchor raising mechanism.

Having described the invention in general. the following examples are given by way of illustration and are not meant to limit this disclosure or the claims to follow.

EXAMPLE I

Preparation of Biocidal Wax 20N

Mineral oil (500 ml) was heated to 45° C. and polyethylene with an average particle size of about 4 micrometers was added to the mineral oil until a saturated solution was obtained. The heated solution was poured into 800 ml of mineral oil at a temperature of 10° C. to form a viscous gel. The gel was separated by carefully removing excess mineral oil. To 500 grams of gel, at 22° C., 100 grams of 2,4,5,6 tetrachloroisophthalonitrile Nopcocide N96 by Diamond Shamrock Corporation) was added and mixed.

A wax mixture (700 grams) was prepared by admixing 210 grams of petrolatum, 161 grams of a chlorinated wax with a molecular average of 12 carbon atoms and 70% chlorine content (Chlorowax 70L), 70 grams of a chlorinated wax with a molecular average of 24 carbon atoms and 42 percent chlorine content (Chlorowax 40), 70 grams of a chlorinated wax with a molecular average of 12 carbon atoms and a chlorine content of 60 percent (Chlorowax 500), 84 grams of a chlorinated wax with a molecular average of 20 carbon atoms and a chlorine content of 40 percent (Chlorowax 100), 105 grams of a microcrystalline wax (Indramic 30), and 14 grams of a black dye (for determining the quality of the wax coating). The wax mixture was mixed at 52° C. and 300 grams of the biocide gel was added and mixed. While mixing was continued, the wax mixture was allowed to cool to room temperature.

EXAMPLE II

Preparation of Biocidal Wax 60N

The procedure of Example I was repeated except that 300 grams of Nopcocide was added instead of 100 grams.

EXAMPLE III

Preparation of Biocidal Wax 100N

The procedure of Example I was repeated except that 500 grams of Nopcocide was added instead of 100 grams.

EXAMPLE IV

Preparation of Biocidal Was 80C

The procedure of Example I was repeated except that 400 grams of cuprous oxide was added instead of 100 grams of Nopcocide.

EXAMPLE V

Preparation of Biocidal Wax F-1

The procedure of Example I was repeated for the preparation of an 80 percent loading of Nopcocide, i.e., 400 grams of Nopcocide to 500 grams of mineral oil. The wax composition comprised 210 grams of Petrolatum, 385 grams of Chlorowax 70L, 105 grams of Indramic, and 14 grams of dye. The wax composition was heated to 55° C., the biocidal gel was added, the mixture was mixed, and it was allowed to cool to temperature.

EXAMPLE VI

Preparation of Biocidal Wax F-2

The procedure of Example V was repeated except that 385 grams of Chlorowax 500 were added instead of Chlorowax 70L.

EXAMPLE VII

Preparation of Biocidal Wax F-3

The procedure of Example V was repeated except that 150 grams of petrolatum were added instead of 210 grams and 245 grams of Chlorowax 40 and 200 grams of Chlorowax 500 were added instead of 385 grams of Chlorowax 500.

EXAMPLE VIII

Application of Examples I-14 VII on a Submerged Surface

Seven steel plates (10 cm×15 cm) were placed in a pan of water at a temperature of about 2° C. Each plate was coated with a wax of the seven previous examples by wiping on the wax with a temperature of 55° C. The wiping was done in a back and forth manner.

The waxes from Examples I-IV were easy to apply and an inspection of the plates showed that the coatings were uniform and complete. Waxes from Examples V and VII were difficult to apply. Often the wax would ball up when the cloth moved in the direction opposite to the direction of application. Visual inspection showed that the coatings were not uniform. The wax from Example VI was difficult to apply and the wax coating was not as uniform as those of the first examples, but was judged to be overall better than the waxes of Examples V and VII.

EXAMPLE IX

Durability of Wax Coatings

Ten stainless steel, mild steel and bronze plates (10 cm×15 cm) were coated with the wax of Examples II in the same manner of Example VIII. The plates were suspended by steel chains in the brackish water of the Severn River in the month of October at a pier at the David Taylor Naval Ship Research and Development Center (DTNSRDC) at Annapolis, Md. The steel chains were coated with the above wax while they were in the river. After 180 days the plates and chains were visually inspected and no sign of corrosion or marine infestation was evident.

EXAMPLE X

Durability of Wax Coating on Hull of Ship

The stainless steel propeller of 70-foot boat at DTNSRDC was coated by brush of a wax from Example III while the propeller was in the Severn River. The wax was 23° C. at the time of application. The propeller was operated about 35 hours over 180 days. Sufficient wax remained to prevent any visible marine infestation at the end of the test.

These examples show that the subject wax compositions can have a high biocide loading, the waxes can be easily applied under water, the wax coatings are durable, and the coatings have an effective leach rate.

Obviously, many modifications and variations of the present invention are possible in light of the above teachings. It is therefore to be understood that, within the scope of the appended claims, the invention may be practiced otherwise than as specifically described.

What is claimed is:

1. A wax-based antifouling coating composition wherein said wax matrix composition comprises from about 16 to 26 weight percent of a chlorinated wax having an average number of carbon atoms from about 11 to about 13 and a chlorine content from about 65 to about 70 percent, from about 8.5 to about 11.5 weight of a chlorinated wax having an average number of carbon atoms from about 22 to about 26 and a chlorine content from about 39 to 45 percent, from about 8 to 12 weight percent of a chlorinated wax having an average number of carbon atoms from about 11 to 13 and a chlorine content from about 55 to about 65 percent, and from about 9 to about 13 weight percent of a chlorinated wax having an average number of carbon atoms from about 18 to about 22 and a chlorine content from about 36 to about 44 percent.

2. The wax-based antifouling coating composition of claim 1 wherein said biocidal gel is in an amount from 25 to 35 weight percent and said biocidal of said biocidal gel is selected from the group consisting of chlorinated biocidals, cuprous oxide, copper-2-ethyl hexoate, and organotin polymers.

3. The wax-based antifouling coating composition of claim 2 wherein said biocidal is in an amount from 40 to 50 percent of total biocidal gel weight.

4. The wax-based antifouling coating composition of claim 2 wherein said wax matrix composition comprises from 25 to 33 weight percent of petroleum; from 21 to 23 weight percent of a chlorinated wax having an average number of carbon atoms of 11.5 to 12.5 and a chlorine content from 68 to 70 percent, from 9 to weight percent of a chlorinated wax having an average number of carbon atoms of 11.5 to 12.5 and a chlorine content from 68 to 70 percent, from 9 to 11 weight percent of a chlorinated wax having an average number of carbon atoms from 23 to 25 and chlorine content from 41 to 44 percent, from about 9 to 11 weight percent of a chlorinated wax having an average number of carbon atoms from 11.5 to 12.5 and a chlorine content from 58 to 62 percent, and from 10 to 12 weight percent of a chlorinated wax having an average number of carbon atoms from 19 to 21 and a chloride from 38 to 42 percent; and from 13 to 16 percent of total wax matrix composition weight of a microcrystalline wax.

5. The wax-based antifouling coating composition of claim 4 which further comprises an anionic surfactant in an amount not in excess of about 3 weight percent.

6. The wax-based antifouling coating composition of claim 5 wherein said surfactant is in an amount from 0.5 to 2 weight percent.

7. A method of preparing a wax-based antifouling coating composition which comprises:
   preparing a polymeric gel of a biocidal by admixing a polymer selected from the group consisting of polyethylene, polypropylene, a copolymer of polyethylene and vinyl acetate, and mixtures thereof, said polymer having an average particle size not in excess of about 5 micrometers, with a solvent at a temperature about the cloud temperature to from a hot concentrated solution of said polymer; shock-cooling said solution to about 10 degrees C. below the cloud temperature; allowing said solution to cool in room temperature; and admixing a biocidal with said gel;
   preparing a wax matrix composition by admixing petroleum, chlorinated waxes, and a microcrystalline wax;
   heating said wax matrix composition to a temperature from about 50 degrees C. to about 60 degrees C.;
   admixing said wax matrix composition with said biocidal gel to from said biocidal wax composition; and
   cooling said biocidal wax composition to room temperature.

* * * * *